United States Patent [19]

Martinez et al.

[11] Patent Number: 5,400,079
[45] Date of Patent: Mar. 21, 1995

[54] REAL TIME DEVICE TO DISPLAY TELEVISION IMAGES ON A SCREEN

[75] Inventors: Michel Martinez, Martignas S/Jalle; Jean-Jacques Favot, Martignas S/Jalles; Jean-Noël Perbet, Eysines, all of France

[73] Assignee: Sextant Avionique, Meudon La Foret, France

[21] Appl. No.: 904,271

[22] Filed: Jun. 25, 1992

[30] Foreign Application Priority Data

Jun. 25, 1991 [FR] France ............... 91 07800

[51] Int. Cl.⁶ ........................... H04N 5/14
[52] U.S. Cl. ..................... 348/571; 348/739
[58] Field of Search .......... 358/140, 11, 12, 141, 358/22, 180, 183, 21 R, 236; H04N 7/01, 11/20, 9/74, 3/223, 5/14; 340/731, 799, ; 348/739, 744, 790, 571, 578, 580, 572; 345/127, 200, 214

[56] References Cited

U.S. PATENT DOCUMENTS

| | | | |
|---|---|---|---|
| 4,134,128 | 1/1979 | Hurst | 358/22 |
| 4,220,965 | 9/1980 | Heitmann | 358/180 |
| 4,772,938 | 9/1988 | Sasson | 358/21 R |
| 4,786,897 | 11/1988 | Takanashi | 340/734 |
| 4,831,445 | 5/1989 | Kawabe | 348/580 |
| 4,916,540 | 4/1990 | Kosaka | 358/22 |
| 5,099,327 | 3/1992 | Murakoshi | 358/140 |
| 5,327,243 | 7/1994 | Maietta et al. | 348/571 |

FOREIGN PATENT DOCUMENTS

0403268 12/1990 European Pat. Off. .
0427147 5/1991 European Pat. Off. .

OTHER PUBLICATIONS

SID, Digest of Technical Papers, vol. 12, May 12, 1987, pp. 416–418, A. Kompolt, "Video to LCD Interface IC Converts Video Signals Into Signals Suitable For LCD's".

*Primary Examiner*—James J. Groody
*Assistant Examiner*—Chris Grant
*Attorney, Agent, or Firm*—Oblon, Spivak, McClelland, Maier & Neustadt

[57] ABSTRACT

A device for receiving a television image and for processing it in real time for display on a different type of screen. The incident television image is digitized and then a micro-zone, selected from a series of predefined micro-zones stored in a screen memory, is assigned to each pixel in the incident image. The image is written into the memory, micro-zone by micro-zone, and then read for display on the screen. Each micro-zone is selected to represent the incident pixel in a way appropriate to the format conversion and/or transformation to be applied to the image.

12 Claims, 2 Drawing Sheets

REAL TIME DEVICE TO DISPLAY TELEVISION IMAGES ON A SCREEN

BACKGROUND OF THE INVENTION

This invention is a device which receives television-type images and processes them, in real-time, to display them on a screen of any known type and format.

In certain applications, it is valuable to be able to display images, received in the form of a standard television images, on a display device other than a cathode ray tube. This applies, for example, in avionics where there is an increasing trend to replace cathode ray tubes by screens consisting of a matrix of, for example, liquid crystals.

In this case, it is necessary to convert the format and, as far as possible, allow the image to be adapted or transformed in various ways (for example to obtain a zoom) in real time and without notable loss in the quality of the image. In this context, the term "real time" means that the time the device takes to process the image is sufficiently short not to introduce any significant delay in its display. This real-time aspect is, obviously, particularly important in applications where the data displayed affects the decision made by the operator, for example, in the case of avionics, the pilot's decision.

SUMMARY OF THE INVENTION

An object of the invention is a device which satisfies these requirements.

To this end, it uses the "micro-region" technique in which a small zone or region (hereinafter called microzone) of adjacent pixels is made to correspond to each point in the incident image. This technique is described, for example, in French patent application No. 2 619 982 filed by THOMSON-CSF.

More precisely, the incident television image is digitized, then a micro-zone, chosen from a series of predefined micro-zones, is associated to each elementary point in the image and written, in one embodiment, into a screen memory; the image written into the memory, micro-zone after micro-zone, is then read for display on the screen. Each micro-zone in the series is defined by its size (number of image points in the micro-zone), its shape (arrangement of the points) and its contents (the colour and luminance of each point). The micro-zone which represents an incident point is chosen to suit the format conversion and/or the processing to be applied to the incident image.

Consequently, in the invention, each incident image point is converted and/or processed by applying a specific local geometrical deformation which, due to the restricted number of points, can be done very quickly progressively as the incident image points are received, thus satisfying the requirement for real-time processing.

Finally, in one embodiment of the invention, the areas common to two micro-zones are mixed, applying a predetermined function (mean, maximum, minimum, etc.).

BRIEF DESCRIPTION OF THE DRAWINGS

The invention will be better understood and other advantages will become clear upon reading the following description, which is a non-exhaustive example, and referring to the appended figure of which:

FIG. 1 is, therefore, a general block diagram of a device according to the invention.

This device receives images, known as "source images" or "incident images", from a video generator $G_V$ for display on a screen item E in the figure.

Video generator $G_V$ is capable of providing monochromatic or colour images complying with a TV standard (for example, 875 lines, 625 lines, 525 lines, 50 or 60 Hz); it is, for example, a television camera.

Screen E can be a matrix screen, i.e. can be addressed in rows and columns (L rows and C columns, i.e. L rows of C elementary points). It can have any predefined format, hereinafter designated by "reconstitution format". It can be monochromatic or colour, a liquid crystal or plasma screen or an indexed cathode ray tube (known as "beam index" tube) or a flat micro-point cathode ray tube. It can also be a conventional cathode ray tube but in this case must be accompanied by digital-analog converters since the data output from the device according to the invention is in digital form. In a colour image, each pixel generally consists of three coloured (red, green and blue) spots known as "sub-pixels". In the remainder of the specification, each "image point" could refer to either a pixel, for a monochromatic image, or a sub-pixel for a colour image.

The device according to the invention comprises:

a group of circuits N to digitize the incident image and to fulfil certain auxiliary functions detailed later;

a group of circuits $G_{\mu m}$ to generate the micromatrices (micro-zones), a micro-matrix being generated for each elementary point in the incident image;

a group of address control circuits $G_{AD}$ which is fed the sync signals from the video generator $G_V$; its output transmits addresses to the micro-matrix generator $G_{\mu m}$ and to the screen E or to a memory M as explained later.

In a first embodiment, the micro-matrix, accompanied by its address and generated by block $G_{\mu m}$, is fed directly to the display screen E, when necessary via analog-digital converters.

In another embodiment, the micro-matrices generated are stored in a screen memory M at an address corresponding to their address on the screen. In this case, block $G_{AD}$ also controls the memory M addresses.

In another embodiment, the micro-matrices generated by block $G_{\mu m}$ are not displayed or memorized directly but a correlator C, connected between the generator $G_{\mu m}$ and memory screen M first applies a predefined mixing, or correlation, process to common parts. To this end, memory M can be read for transmission to correlator C.

Figure 1:
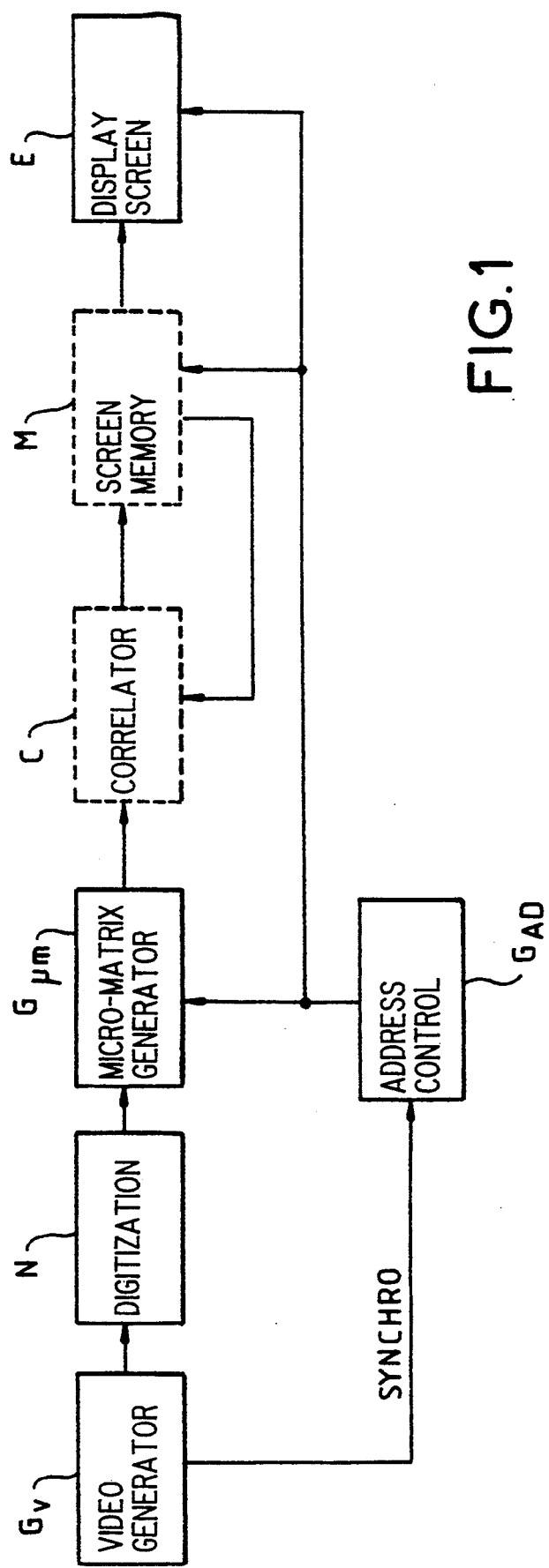
FIG. 1 is a general block diagram of the device according to the invention.

Correlator C and memory M are shown in dotted lines in FIG. 1 because they are not essential to the operation of the device according to the invention.

This device operates as follows.

Block N digitizes the analog image transmitted by video generator $G_V$ progressively as it is received. The memory in micro-matrix generator $G_{\mu m}$ contains a series of predefined micro-matrices and assigns a certain macro-matrix in the reconstitution format to each of the elementary points in the incident image. The image can be displayed, i.e. reconstituted, on screen E in any format but the device must know the relationship between the incident image format and the reconstituted format. The micro-matrices are displayed on screen E (or stored in memory M, with or without correlation of overlapping points) so that they are positioned from the address of the elementary point after format conversion. This later address is known as the micro-matrix address or micro-matrix address point.

Each micro-matrix is defined by its size (number of elementary points it contains), shape (arrangement of these points) and contents (luminance and colour of each point). These parameters can be chosen in any way but, to limit memory size and processing time, matrices should not contain an excessively large number of points; for example, 4×4 point matrices represent a good compromise. A micro-matrix can contain, for example, a maximum-brightness point (which may, for example, be in its center), the other points in the micro-matrix representing greater or lesser variations in half-tones representing, for example, a transition to the rest of the image. The macro-matrix can have any form; the macro-matrix address point is not necessarily in its center and is, in fact, only a reference point about which the device is capable of positioning the micro-matrix.

The micro-matrix for a specific point in the incident image is, obviously, selected as a function of the characteristics of screen E, i.e. its format (reconstitution format), its luminance levels and its colour organization (for example periodic organizations known as QUAD, diagonal, Stripe, etc.); however, it also depends on the micro-matrix positioning error due, as will be seen later, to the format conversion, on the colorimetric form of the micro-matrix address point environment and, finally, on any geometric conversion applied to the incident image. With such a device, it is possible to enlarge or, on the contrary, reduce part of the incident image, rotate the incident image or, in more general terms, apply any predefined deformation (for example, pincushion deformation to correct this type of distortion); the size and shape of each successive micro-matrix as well as the address are adapted to suit the required conversion.

Consequently, a format conversion or an image deformation are applied, in the invention, by local geometrical deformation, using the size and/or shape of the micro-matrix selected, progressively as the incident image points are received.

Figure 2:
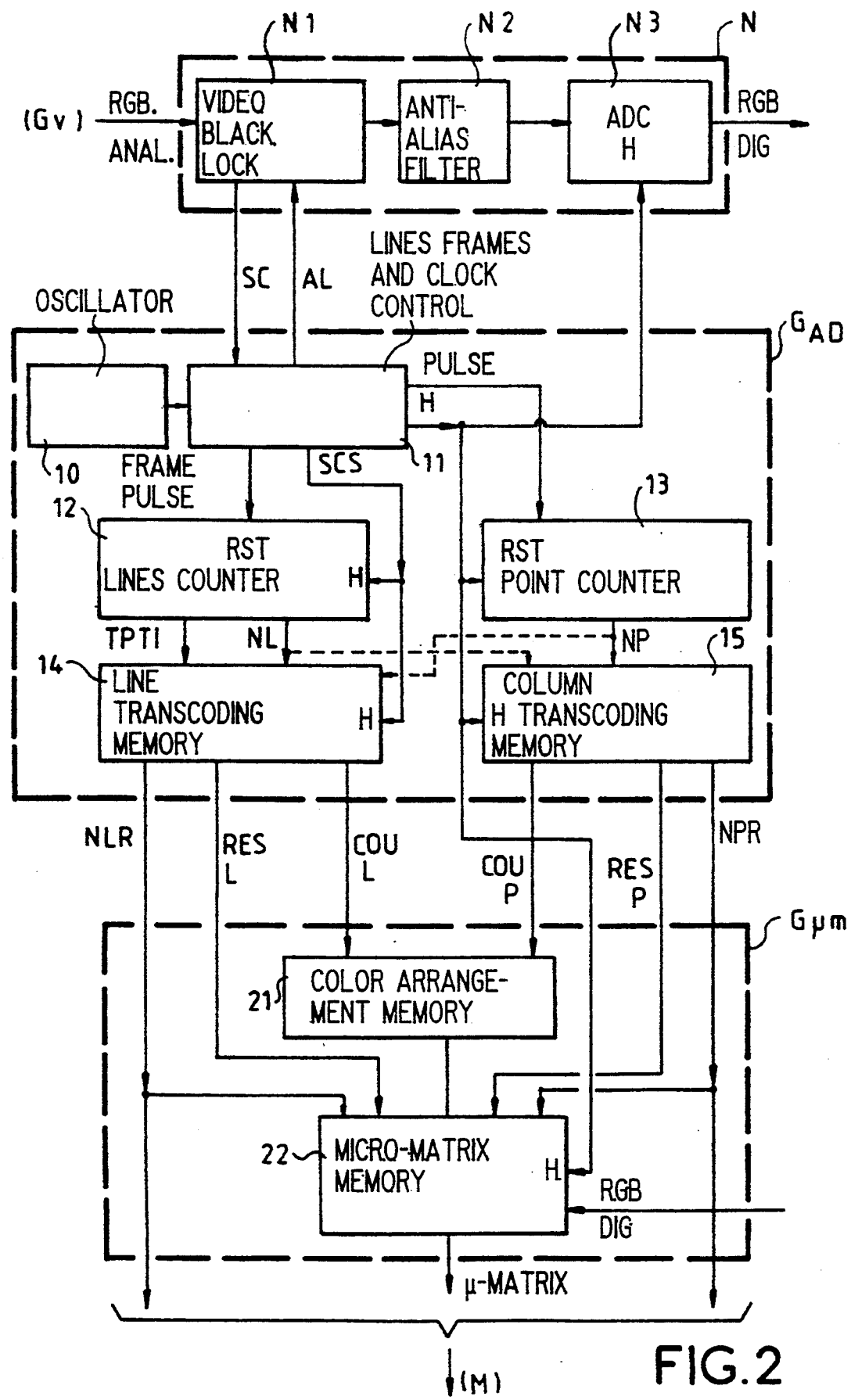
FIG. 2 is a block diagram of an embodiment of the invention; The same numbers apply to the same components on both figures.

FIG. 2 illustrates a method of producing the N, $G_{\mu m}$ and $G_{AD}$ blocks shown in the block diagram in FIG. 1. As an example, the following description applies to colour incident image, consisting of two interlaced frames.

The digitization block N is therefore fed the analog trichromatic signal, designated RGB, received from video generator $G_V$. It should be noted that the device according to the invention receives the RGB signal after separation of the colours, these being separated by a conventional method known to the prior art (and not represented) upstream of the device. As in the prior art, this block comprises, upstream of an analog-digital conversion block $N_3$, and in sequence, a circuit $N_1$ to lock the incident video black level which, as in the prior art, keeps the black level at a constant value, and an anti-alias filter $N_2$ which, again as in the prior art, is a low-pass filter to eliminate faults caused by digitization of the signal. To this end, black-lock circuit $N_1$ is fed a video black-lock signal AL output by the address control block $G_{AD}$. The conversion block $N_3$ consists of three analog-digital converters, i.e. one per colour. Block N outputs a digitized locked and filtered video signal, the global signal being designated RGB DIG and containing three samples or sub-pixels, R, G and B respectively, for each pixel.

The address control block $G_{AD}$ comprises an oscillator 10, for example a crystal oscillator, which feeds a reference frequency to a line, frame and clock control circuit 11. Circuit 11 is fed the composite sync signal SC which block N generates from the incident image. From this signal and the reference frequency output by oscillator 10, circuit 11 generates a line-start pulse, a frame-start pulse, a signal H, which is the device general clock, and finally a composite sync signal SCS synchronous with the signal output by oscillator 10. Circuit 11 can be a programmable array logic circuit (PAL). Clock signal H is fed to converter $N_3$ to set the incident signal sampling frequency.

Block $G_{AD}$ also includes an incident image line counter 12 and an incident image point counter 13 which respectively count the lines and points, one at the frequency of sync signal SCS and the other at that of clock signal H. They are reset by the frame and line pulses respectively. Line counter 12 therefore outputs the current line number NL and a signal TPTI indicating whether the frame is even or odd-numbered; these signals are fed to a line memory 14. The points counter 13, in a similar way, feeds the number of the current point NP to a column memory 15.

At this point, all operations needed to identify the addresses of image points in the TV-standard incident signal have been completed; the next step is transcoding from the incident format to the reconstitution format.

The main function of memory 14 known as the "line transcoding memory" is to allocate a row number NLR in the reconstitution format corresponding to the incident image line number NL. In a similar way, the column transcoding memory 15 assigns a point number NPR in the reconstitution format corresponding to the incident point number NP. Moreover, when the incident format and the reconstitution format differ, neither the number of lines nor the number of points per line in the incident image are the same as in the displayed image and, in general, they are not even multiples of each other; consequently, format conversion generates a positioning error, or "conversion calculation residual", both in the position of the row in the frame (designed RESL) and in the position of the point on the line (RESP). This positioning error data is subsequently used to select a micro-matrix whose center of luminance is shifted from its geometrical center by the previous error. Finally, the line transcoding memory 14 indicates the colour of the line (signal designated COUL) relative to surrounding lines since, with any screen with a given periodic colorimetric organization (QUAD, diagonal, etc.), the current row address in the display format gives information on the colour of the line. In a similar way, the column transcoding memory 15 indicates the colour of the point (COUP) relative to the colour of other points in the row. The colour environment around the micro-matrix address point is therefore known at this stage.

In addition, the links which allow the line transcoding memory 14 to receive the current point number NP and the column memory 15 to receive the current line number NL are shown dotted. These links are used when the transformation to be applied to the incident image is not orthogonal (image rotation, a predefined deformation of the image, etc.).

The signals output by block $G_{AD}$ are fed to the micromatrix generator block $G_{\mu m}$, which is also fed the digitized incident video signal RGB DIG.

In a first embodiment of the device, this block $G_{\mu m}$ can be a single memory which stores all the possible macro-matrices the device uses and the incident signals (RBG DIG, NLR, RESL, COUL, NPR, RESP and COUP) which form the memory addresses. It outputs a micro-matrix, i.e. a set of adjacent elementary points to be stored in the screen memory M or to be displayed directly on the screen E. The micro-matrix address (for example the address of its center) consists of the row number and point number in the reconstitution format, respectively signals NLR and NPR.

In another embodiment, shown in FIG. 2, the single memory mentioned is split down into two memories items 21 and 22 respectively. It is found, in fact, that signals COUL and COUP form only a restricted number of colour arrangements; memory 21 therefore contains the various possible colour arrangements while memory 22 contains the various micro-matrices in the device and, therefore, in this embodiment, is not longer addressed directly by signals COUL and COUP but by the signal output by memory 21. This considerably reduces the total memory capacity required for block $G_{\mu m}$.

Memory 22 contains at least all the micro-matrices required to switch from a given TV standard to a given type of matrix screen. It can also contain additional micro-matrices to provide certain options both for the incident format and the reconstitution format: for example, memory 22 can contain all micro-matrices required to process TV signals to two separate standards; the transcoding memories 14 and 15 and the $G_{\mu m}$ block are then informed of the options chosen.

As far as image deformation is concerned, block $G_{\mu m}$ again contains all the micro-matrices necessary to obtain the required deformation; if a number of different deformations are possible, the transcoding memories and block $G_{\mu m}$ must also be informed.

In another embodiment of the invention, if there are a large number of options, either in terms of formats and/or deformation, to avoid the need for excessively large transcoding memories, these memories no longer contain all options possible but are loaded by a computer which calculates the transcoding required from the options selected.

As indicated previously, if the embodiment includes a memory screen M, it is possible to generate micro-zones which partially overlap and apply a predefined mixing or correlation function to the areas common to several micro-zones. It should be noted that, if the device does not include a correlator but uses a directaccess memory, it is possible to generate overlapping micro-zones and then overwrite the contents of the micro-zone already memorized. However, the quality of the reconstituted image is better if the micro-zones are created to be adjacent without overlapping.

In the embodiment which includes common-area correlation, the contents of memory M are read at the appropriate addresses, for each micro-matrix to be stored, the memorized data is mixed with the incident data and the results are then stored in memory M using a read-change-write procedure. The correlation function is applied to each elementary point in the micro-zone; correlation may be an adding, mean, maximum, minimum or combined function, for example an identical function can be applied to all points in the micro-matrix or different functions can be applied to the same micro-matrix, for example one function per colour.

Because screen memory M access is required and to avoid delaying image processing, it is preferable to organize memory M as appropriate, i.e. in independently and simultaneously addressable blocks: memory M must then consist of as many blocks as there are points in the largest micro-matrix; consequently, it is possible to both write and read in parallel in the minimum time. This type of structure is described, for example, in French patent application No. 90 10587 filed by SEXTANT Avionique.

In addition, if the device includes a screen memory M, this memory will preferably consist of two pages, one page to accommodate an image frame, progressively as it is processed, and a second page to contain the previous frame being read and transmitted to screen E.

Consequently, the device according to the invention operates at the level of each elementary point in the incident image, i.e. each sub-pixel in the case of a colour image, to convert the format and/or process this incident image; this allows a high degree of processing flexibility. In addition, since local geometrical deformation is applied to a restricted number of points (the micro-matrix) for conversion or processing, both operations can be applied progressively as the incident image points are received since both the generation of micro-matrices and correlation (if the screen memory is organized into independent blocks offering simultaneous access) are sufficiently fast to be completed within the length of a frame (20 ms for the 50 Hz standard or 16 ms for a 60 Hz standard) and the maximum delay between the video generator and the image displayed is therefore one frame (if the device comprises a memory M) : it is therefore reasonable to refer to the device as a "real-time device".

Moreover, there is virtually no limit on the types of micro-matrices which can be stored and, consequently, a very wide range of format conversion and deformation is possible: it is therefore possible to use the device according to the invention to convert an incident image into a "stripe" format in which the row and column pitch differ and which is used, in particular, for certain liquid crystal displays, or to apply non-orthogonal transformation to the image.

What is claimed is:

1. A device to display television images on a screen, each television image being referred to as an analog incident image and an image displayed on the screen as a reconstituted image according to a reconstitution format, the analog incident image being formed by analog incident points, the device comprising:
means for receiving said analog incident image and outputting progressively a digital incident image as digital incident points;
address control means for identifying addresses of said analog incident points and converting said addresses into the reconstitution format;
means for receiving said outputted digital incident image and generating a micro-matrix containing a plurality of elementary points, for each of the digitized incident points as it is received, the micro-matrix being selected from a series of micro-matrices whose size, form and content are defined according to the reconstitution format, wherein each of the micro-matrix selected by said digitized incident points of said incident image form the reconstituted image.

2. A device as claimed in claim 1, wherein the address control means comprise:
   means for identifying addresses of the analog incident points;
   transcoding means which allocate each analog incident point to a respective row number and point number in the reconstituted format.

3. A device as claimed in claim 2, wherein the transcoding means includes a means for outputting a position error signal resulting from a difference between a format of the reconstituted image and a format of said incident image.

4. A device as claimed in claim 2, wherein the identification means comprise:
   first means to generate a line pulse, frame pulse and clock signal from a incident image synchronization signal;
   a line counter and point counter receiving the signals output by the first means and outputting a row number and point number in the reconstituted format for each analog incident point.

5. A device as claimed in claim 4, wherein the transcoding means comprise:
   a line transcoding memory receiving the signal output by the line counter;
   a column transcoding memory receiving the signal output by the point counter,
   these line and column memories outputting the row number and a line residual and the point number and a point residual respectively.

6. A device as claimed in claim 2, wherein the micro-matrix generation means comprise means for storing the series of predefined micro-matrices, these storage means being addressed by a row number and point number corresponding to a point in the reconstitution format and the residuals from transcoding calculation.

7. A device as claimed in claim 6, wherein the transcoding means also output line colour and point colour for each point in the reconstituted image, this colour data forming an additional part for addressing the storage means.

8. A device as claimed in claim 6, wherein the storage means comprises two memories:
   a first colour arrangement memory, addressed by row colour and column colour signals for outputting a signal
   a second memory addressed by the first memory output signal, by the row number and point number corresponding to the point in the reconstituted format and by the residuals from the transcoding calculation.

9. A device as claimed in claim 1, further comprising a screen memory for storing successive micro-matrices in the reconstitution format.

10. A device as claimed in claim 6, further comprising correlation means, connected between the micro-matrix generation means and a screen memory, which applies a mixing function between common areas of the micro-matrices and an image memory contents for each micro-matrix.

11. A device as claimed in claim 1, wherein the micro-matrix is further defined as a function of a geometrical transformation required.

12. A device to display television images on a screen, each television image being referred to as an analog incident image and an image displayed on the screen as a reconstituted image according to a reconstitution format, the analog incident image being formed by analog incident points, the device comprising:
   means for receiving said analog incident image and outputting progressively a digital incident image as digital incident points;
   address control means for identifying addresses of said analog incident points and converting said addresses into the reconstitution format wherein said address control means includes a means for identifying addresses of the analog incident points and a transcoding means which allocates each analog incident point to a respective row number and point number in the reconstituted format with said transcoding means including a means for outputting a position error signal resulting from a difference between a format of the reconstituted image and a format of said incident image;
   means for receiving said outputted digital incident image and generating a micro-matrix containing a plurality of elementary points, for each of the digitized incident points as it is received, the micro-matrix being selected from a series of micro-matrices whose size, form and content are defined according to the reconstitution format.

* * * * *